(No Model.)

G. W. HOGAN.
FRUIT AND NUT GATHERER.

No. 310,429. Patented Jan. 6, 1885.

WITNESSES
F. L. Durand
J. Reed Littell

INVENTOR
G. W. Hogan
by
A. Snow & Co.
Attorneys.

UNITED STATES PATENT OFFICE.

GEORGE WASHINGTON HOGAN, OF BENTONVILLE, ARKANSAS.

FRUIT AND NUT GATHERER.

SPECIFICATION forming part of Letters Patent No. 310,429, dated January 6, 1885.

Application filed September 7, 1883. (No model.)

*To all whom it may concern:*

Be it known that I, GEORGE W. HOGAN, a citizen of the United States, residing at Bentonville, in the county of Benton and State of Arkansas, have invented certain new and useful Improvements in Fruit and Nut Gatherers, of which the following is a specification, reference being had to the accompanying drawings, wherein—

Figure 1:
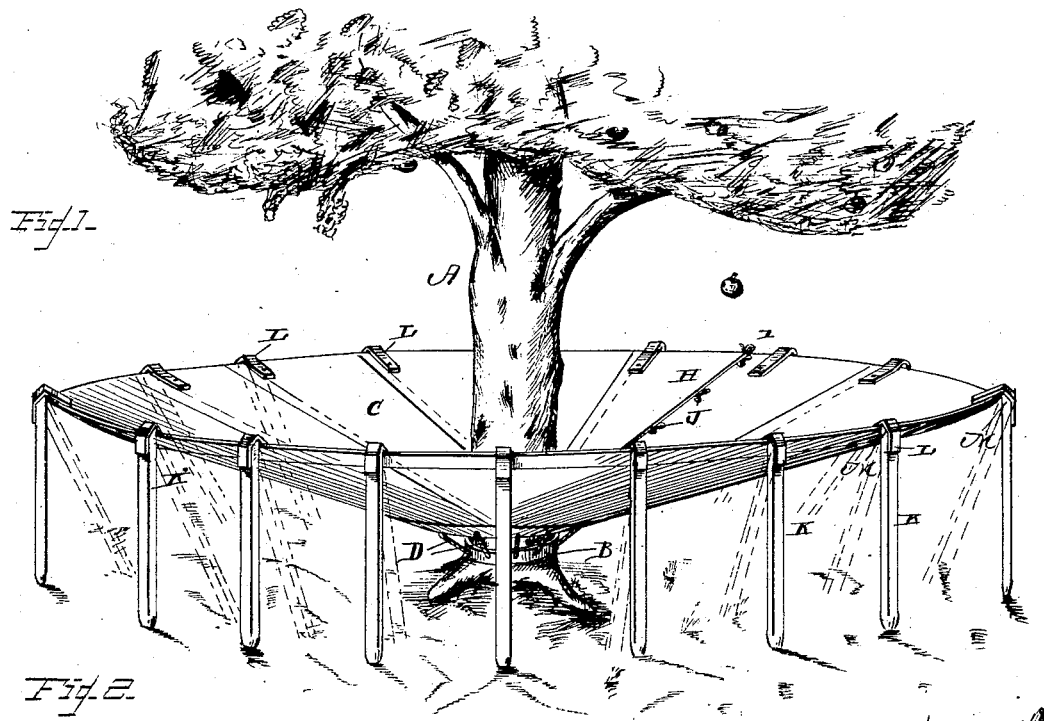
Figure 2:
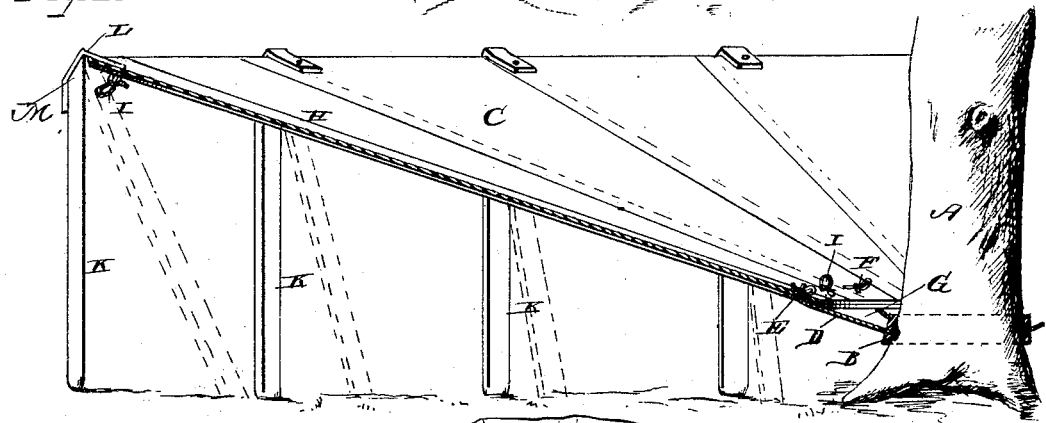
Figure 3:
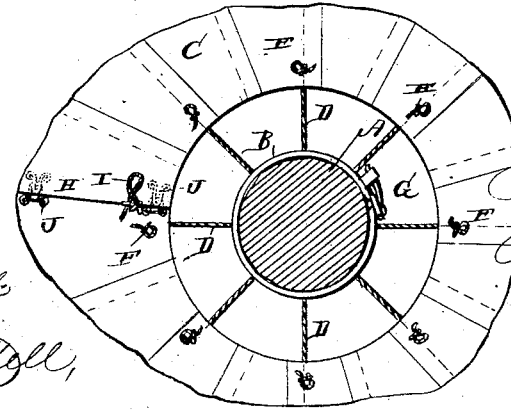

Figure 1 is a perspective view of the invention, showing it in position around a tree. Fig. 2 is a vertical sectional view thereof. Fig. 3 is a detail sectional view taken through the trunk of the tree on a line above the gatherer.

My invention relates to that class of fruit and nut gatherers wherein the falling fruit after being severed from the tree is intercepted on its way to the ground by an inclined plane, of canvas or other flexible material, breaking its fall, preventing it from being bruised, and guiding it to some convenient place for collection. In former devices of this general character it has been customary to give such an inclination to the canvas body that the fruit, &c., should enter a spout arranged at the lowermost point of its sag, and from thence be discharged upon the ground at one side of the tree or into some chosen receptacle.

The object of my device is to gather the fruit and distribute it uniformly about the base of the tree where the ground is ordinarily dry, and where it will be protected fully by the foliage from the rays of the sun and from frost.

For this purpose the invention consists in certain peculiarities of structure, hereinafter described, and particularly pointed out in the claim.

Referring to the drawings hereunto annexed, and the designating-letters marked thereon, A represents a fruit or nut tree, and B a band-strap, secured about the base of the tree firmly by means of a buckle or other analogous fastening. The said band is perforated at regular distances throughout its length, and through said perforations extend the inner ends of a series of ropes, D. These ropes or cords extend radially outward from the belt and pass through a series of eyelets, F, arranged near the inner edge of a circular canvas apron, C. The open space between the inner edge of the apron and the belt can be regulated by drawing the cords D a greater or less distance through the eyelets and tying knots F in such cords. This adjustment is effected before the belt is attached to the tree, and adapts the device to various kinds and sizes of fruit. The apron C is composed of a number of strips of canvas or like material overlapping each other and united by sewing or otherwise, except at the adjoining edges H, where they are separated. Along these edges the apron is adapted to be joined, so as to form a continuous surface by means of the cords I I and intermediate hooks and eyes, J J. At its outer periphery the apron is provided with a series of pointed supports, K, joined to the peripheral edge by means of the flexible strips L. The supports are beveled at M to secure a better engagement with the strips.

The parts being constructed as described, the operation of my invention is as follows: The apron is spread upon the ground beneath the tree and around it, the supports or stays being pointed toward the tree-trunk. The strap-band B is then buckled around the trunk about twelve or eighteen inches from the ground, or may be nearer the ground. The radial cords D are then adjusted to suit the size and kind of fruit to be gathered, the opening between the trunk of the tree or strap-band and the inner edge of the apron being narrowed or widened at will to suit the exigencies of the case. The edges H of the apron are then joined by means of the cords I I and hooks and eyes J J, and the suports or stays K fixed firmly in the earth, their pointed ends inclining toward the tree. In this position the supports balance each other and maintain the device in an upright position. The grade of descent of the apron toward the tree may be regulated by moving the pointed ends of the stays inwardly or outwardly from the trunk, according as the flow or descent of fruit is too rapid or too slow. Provision is also made to prevent careening of the gatherer in consequence of wind or the fall of a shower of fruit upon one side of the apron, by attaching guy-ropes to the outer periphery at, say, three points, as nearly equidistant from each other as practicable, the outer ends of these guy-ropes being anchored to the ground by means of hard-wood pins.

The fruit is shaken or otherwise detached from the tree, and passing down the inclined sides of the apron passes through the space between the tree-trunk and the inner edge of the apron, and forms a pile or heap about the sides of the trunk and at the very central point of protection by the foliage. In this position, if exposed for any length of time, it is at the most advantageous point for safety against the drying or desiccating effects of the sun and the blight of frost, and the ground being much drier at the foot of the tree the liability of the fruit to rot is greatly lessened. When the gatherer is to be removed to another tree the guys are loosened and the ropes I I and hooks and eyes J J undone. The gatherer thereupon falls to the ground. The strap is then unbuckled and two persons, commencing at the free edges H of the apron, walk, one to the right and the other to the left, about the tree gathering up the canvas and stays on the way until they meet at the opposite side of the trunk. They then walk side by side to the next tree, where, by a reverse motion, the canvas is spread out about the latter and again set up, as hereinbefore described. It is evident that the size of the central aperture may be lessened, if desired, by carrying one of the free edges H beyond the other and fastening it in its overlapped position. This is advantageous, moreover, when a greater pitch or incline to the apron is desired than can be given by the stays alone.

If for any reason it should become advisable to use the gatherer as a receptacle for the falling fruit, this result may be secured by merely placing an annular piece of canvas upon the cords D, closing thereby the central opening.

With the finer grades or qualities of fruit, to prevent bruising by striking against the tree-trunk, the latter may be provided with a cushion placed around its base beneath the apron.

I am aware that it is not new to arrange a canvas receptacle under a tree to intercept the falling fruit before it reaches the ground; but such receptacles have generally been suspended from the trees or supported by props, &c., and have spouts to permit the fruit to fall through, while mine has an adjustable central opening and flexibly-connected adjustable supports, and the construction is also different.

Having thus described my invention, what I claim, and desire to secure by Letters Patent, is—

As an improvement in fruit-gatherers, the combination of the belt, the circular apron, the series of supports or stays flexibly connected with the outer periphery thereof, whereby the inclination of said apron may be varied at will, the inner periphery provided with a series of eyelets, and being disposed some distance from the belt, and a series of radial cords extending from the belt to and through the said eyelets and knotted at the face of the apron, these cords being adjustable in the perforations to regulate the distance between the apron and the tree, substantially as set forth.

In testimony that I claim the foregoing as my own I have hereto affixed my signature in presence of two witnesses.

GEORGE WASHINGTON HOGAN.

Witnesses:
 ALEX. G. BLACK,
 C. C. HUFFMAN.